United States Patent [19]

O'Mahony

[11] 4,266,153
[45] May 5, 1981

[54] DEMODULATOR OF POLYPHASE VOLTAGES INTERFERING AMONG THEMSELVES

[76] Inventor: Gérard O'Mahony, 95 rue de Versailles, 92410 Ville d'Avray, France

[21] Appl. No.: 33,957

[22] Filed: Apr. 27, 1979

[30] Foreign Application Priority Data

Apr. 28, 1978 [FR] France ................. 78 12835

[51] Int. Cl.³ .......................................... H02K 39/00
[52] U.S. Cl. ..................................... 310/111; 310/114; 310/127; 363/152
[58] Field of Search ............... 310/111, 114, 126, 127, 310/159, 160, 177, 179, 180, 184, 185, 193, 261, 202, 264, 265; 363/152, 153

[56] References Cited

U.S. PATENT DOCUMENTS

| Re. 12,223 | 5/1904 | Leblanc | 363/152 |
|---|---|---|---|
| 1,799,156 | 4/1931 | Dornig | 310/111 |
| 2,120,109 | 6/1938 | Merrill | 310/111 X |
| 2,769,106 | 10/1956 | Dembowski | 310/127 X |
| 3,071,703 | 1/1963 | Mathews | 310/111 |
| 3,956,649 | 5/1976 | Silverman | 310/111 |
| 4,127,802 | 11/1978 | Johnson | 310/114 X |

Primary Examiner—Mark O. Budd
Attorney, Agent, or Firm—Burns, Doane, Swecker & Mathis

[57] ABSTRACT

A demodulator for the demodulation of polyphase, in particular triphase, voltages interfering among themselves and constituting a system of polyphase pseudo-sinusoidal voltages modulated in amplitude to a pulsation $\epsilon$, to obtain a system of polyphase voltages with a pulsation $\epsilon$. The demodulator comprises a polyphase rotating machine including three 3-phase armatures connected through a common yoke made up of a low magnetic loss material, and fed by three systems of polyphase pseudo-sinusoidal voltages modulated in amplitude to a pulsation $\epsilon$. A rotor freely rotates within the armature and includes three magnetic circuits connected through a common magnetic axle with the flux carrying parts of the rotor being a low loss magnetic material. Three static coils are disposed concentric with the axis of the magnetic rotor axle, and three systems of polyphase voltages of pulsation $\epsilon$ are collected at the respective terminals of the coils. The invention has application in particular to the realization of a generator of triphase voltages of a given pulsation $\epsilon$ from a machine rotating at a speed much higher than $\epsilon$.

17 Claims, 19 Drawing Figures

DEMODULATOR OF POLYPHASE VOLTAGES INTERFERING AMONG THEMSELVES

BACKGROUND OF THE INVENTION

This invention pertains to a demodulator applicable to the demodulation of polyphase voltages of n phases interfering among themselves by constituting a system of polyphase pseudo-sinusoidal voltages modulated in amplitude to a pulsation $\epsilon$, in order to obtain a system of polyphase voltages of pulsation $\epsilon$.

The interference between two sinusoidal voltages of frequencies $f_1$, $f_2$ or pulsations $\omega_1$, $\omega_2$, and of different amplitudes $U_1$, $U_2$ is a well known phenonmenon, currently used in radio, in the technique of synchroscopes, of transmitters, etc.

This phenomenon may be summarized by the following equation:

$$U(t) = U_1 \sin \omega_1 t + U_2 \sin \omega_2 t = 2U_o \cos (\epsilon t) \sin (\omega t) + 2e \sin (\epsilon t) \cos (\omega t) \quad (1)$$

in which $$\omega_1 = \omega + \epsilon$$

$$\omega_2 = \omega - \epsilon$$

and $$U_1 = U_o + E$$

$$U_2 = U_o - e$$

where $\omega$ = average pulsation and $U_o$ = average voltage of the component sinusoidal voltages.

The general nature of this voltage, resulting from the "pulsating" $U(t)$, is given in FIG. 1 by the solid line $C_1$.

Of course, if two systems of polyphase voltages are placed in series, phase to phase, n voltages analogous to the preceding, within the same envelope, but differing in phase by $2\pi/n$ (n being the number of phases for each system) are obtained. FIG. 2 shows the graphs of these voltages which, mathematically, may be expressed as follows:

$$U_A = U_1 \sin (\omega_1 t) + U_2 \sin (\omega_2 t) \quad \text{(graph 1)}$$

$$U_B = U_1 \sin(\omega_1 t - \tfrac{2\pi}{3}) + U_2 \sin(\omega_2 t - \tfrac{2\pi}{3}) \quad \text{(graph 2)} \quad (2)$$

$$U_C = U_1 \sin(\omega_1 t + \tfrac{2\pi}{3}) + U_2 \sin(\omega_2 t + \tfrac{2\pi}{3}) \quad \text{(graph 3)}$$

In addition, if the differential voltage $e=0$, that is if $U_1 = U_2 = U_o$ the resulting voltage $U(t) = 2U_o \cos \epsilon t \sin \omega t$, may be described as a "pseudo-sinusoidal" voltage of pulsation $\omega$, and variable amplitude $2U_o \cos \epsilon t$. The same is true for the resulting voltages from the 2 polyphase systems placed in series, phase to phase, and previously described. This corresponds to the case of FIG. 3a in which:

$$U_{a1} = U_o \sin (\omega_1 t) + U_o \sin (\omega_2 t) = U_{11} + U_{21} \quad \text{(graph } a_1\text{)}$$

$$U_{a2} = U_o \sin (\omega_1 t - \tfrac{2\pi}{3}) + U_o \sin (\omega_2 t - \tfrac{2\pi}{3}) = U_{12} + U_{22} \quad \text{(graph } a_2\text{)} \quad (3)$$

$$U_{a3} = U_o \sin (\omega_1 t + \tfrac{2\pi}{3}) + U_o \sin (\omega_2 t + \tfrac{2\pi}{3}) = U_{13} + U_{23} \quad \text{(graph } a_3\text{)}$$

In addition, if we proceed to circular permutations of the phases of the second polyphase system in relation to the first, we obtain n groups of voltages, the general aspect of which is similar to that of the first group, but the respective envelopes of which are staggered between themselves. Thus we see on FIGS. 3a, 3b, and 3c the example of three groups of voltages with:

$$U_{b1} = U_o \sin (\omega_1 t) + U_o \sin (\omega_2 t - \tfrac{2\pi}{3}) = U_{11} + U_{22} \quad \text{(graph } b_1\text{)} \quad (4)$$

$$U_{b2} = U_o \sin (\omega_1 t - \tfrac{2\pi}{3}) + U_o \sin (\omega_2 t + \tfrac{2\pi}{3}) = U_{12} + U_{23} \quad \text{(graph } b_2\text{)}$$

$$U_{b3} = U_o \sin (\omega_1 t + \tfrac{2\pi}{3}) + U_o \sin \omega_2 t = U_{13} + U_{21} \quad \text{(graph } b_3\text{)}$$

$$U_{c1} = U_o \sin \omega_1 t + U_o \sin (\omega_2 t + \tfrac{2\pi}{3}) = U_{11} + U_{23} \quad \text{(graph } c_1\text{)} \quad (5)$$

$$U_{c2} = U_o \sin (\omega_1 t - \tfrac{2\pi}{3}) + U_o \sin \omega_2 t = U_{12} + U_{21} \quad \text{(graph } c_2\text{)}$$

$$U_{c3} = U_o \sin (\omega_1 t + \tfrac{2\pi}{3}) + U_o \sin (\omega_2 t - \tfrac{2\pi}{3}) = U_{13} + U_{22} \quad \text{(graph } c_3\text{)}$$

The vectorial representation of these equations appears on FIGS. 4a, 4b, and 4c, in which the system $U_{11}$, $U_{12}$, and $U_{13}$ rotates at a speed $(\omega t + \epsilon t)$ and the system $U_{21}$, $U_{22}$, and $U_{23}$ rotates at the speed $(\omega t - \epsilon t)$. The resulting voltages $(U_{a1}, U_{a2}, U_{a3})$, $(U_{b1}, U_{b2}, U_{b3})$, and $(U_{c1}, U_{c2}, U_{c3})$ form three "pseudo-triphase" systems of variable amplitudes respectively equal to $U_{Ao} = 2U_o \cos \epsilon t$, $U_{Bo} = 2U_o$ $$\cos (\epsilon t - \tfrac{2\pi}{3}), \; U_{Co} = 2U_o \cos (\epsilon t + \tfrac{2\pi}{3}). \quad (6)$$

An object of this invention is to provide a novel system for the utilization of this "pulsating" phenomenon to obtain a system of polyphase voltages with a given, constant or variable frequency f, and corrrespondig to the pulsation $\epsilon$ from an electric generator producing voltages responding to the above described equations (3, 4, and 5).

A more specific object of this invention is to provide a novel demodulator which responds to systems of polyphase voltages with n phases and responding to n systems of n equations of the kinds of (3) to (5), to provide a system of n polyphase voltages presenting a frequency corresponding to the pulsation $\epsilon$ of the modulation in amplitude of the component voltages of the said systems of polyphase voltages.

Known modulators of this general kind use the various rectifier electronic components. However, such modulators are rather involved and require the use of a large number of such components, which increases the cost and decreases the reliability of the system.

This invention aims specifically at coping with the aforementioned disadvantages and at permitting signal demodulation of the kind previously mentioned in a manner altogether simple, effective, and reliable. These goals are attained through a demodulator according to the invention which comprises a polyphase rotating machine including basically (a) n armatures at n phases interconnected by means of a common yoke made up of a low loss magnetic material and fed by n systems of polyphase pseudo-sinusoidal voltages modulated in amplitude at a pulsation $\epsilon$, (b) a freely rotatable rotor, comprising n magnetic circuits interconnected through a common magnetic axle having its flux carrying parts of a low loss magnetic material, and (c) n static coils concentric with the axis of the magnetic axle and at the terminals of which n systems of polyphase voltages of pulsation $\epsilon$ are collected, which rotating machine is such that each of the n magnetic circuits of the rotor bears a number of polar masses equal to the number of pairs of poles on the corresponding armature, and the relative geometric keyings of homologous phases of the n armatures of the stator are identical to the relative longitudinal keyings of the polar masses of the rotor.

The demodulator, according to the invention, permits the realization of machines the size and weight of which are relatively small compared to the amounts of energy collected, and to the speeds of rotation which may be very high.

According to one embodiment of the invention, the parts of the rotor and of the yoke subjected to an alternating magnetic flux are made up of stacked laminated sheet steel including first stacks of sheet steel which are parallel to the axis of the rotor and surrounded and bound by second stacks of sheet steel which are perpendicular to the axis of the rotor.

According to one particular embodiment of the invention, the first stacks of sheet steel, parallel to the axis of the rotor are made up of stacks of flat sheet steel incorporated into the polar masses of the rotor.

According to another embodiment of the invention, the first stacks of sheet steel, parallel to the aixs of the rotor form a crown concentric with the axis of the rotor and made up of a complex of sheet steel forming portions of a cylinder in the form of an involute of a circle.

According to still another embodiment of the invention, the first stacks of sheet steel, parallel to the axis of the rotor, are mounted on the rotor in the fashion of insulating plates of the collector of a direct current machine.

Other characteristics, objects and advantages of the invention will be better understood from reading the following detailed description of the specific forms of the invention, given only as non-limiting examples, with reference to the attached drawings.

BRIEF DESCRIPTION OF THE DRAWINGS

FIGS. 8, 10 and 12 are partial axial sectional views of specific forms of realization of the demodulator according to the invention;

DETAILED DESCRIPTION

Figure 1:
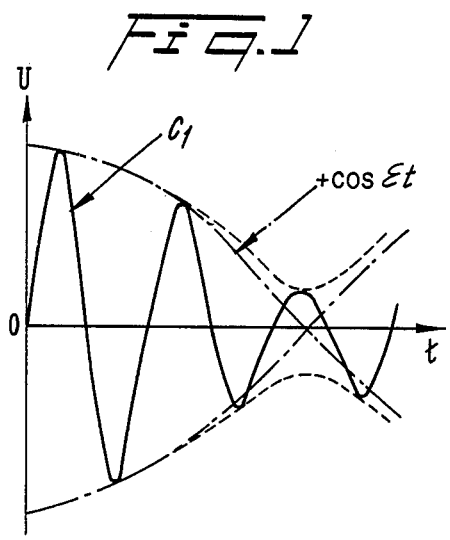
FIG. 1 is a graph representing the voltage corresponding to the equation (1)
Figure 2:
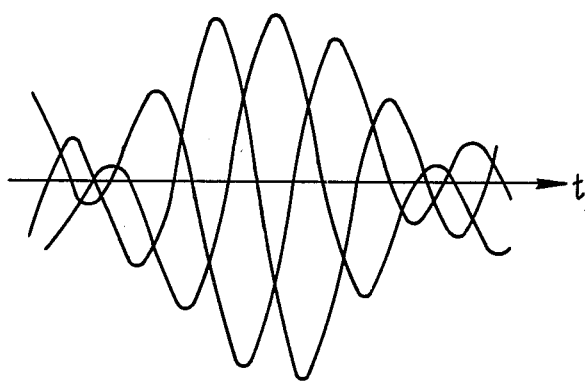
FIG. 2 is a graph representing the voltage corresponding to the equations (2)
Figure 3A:
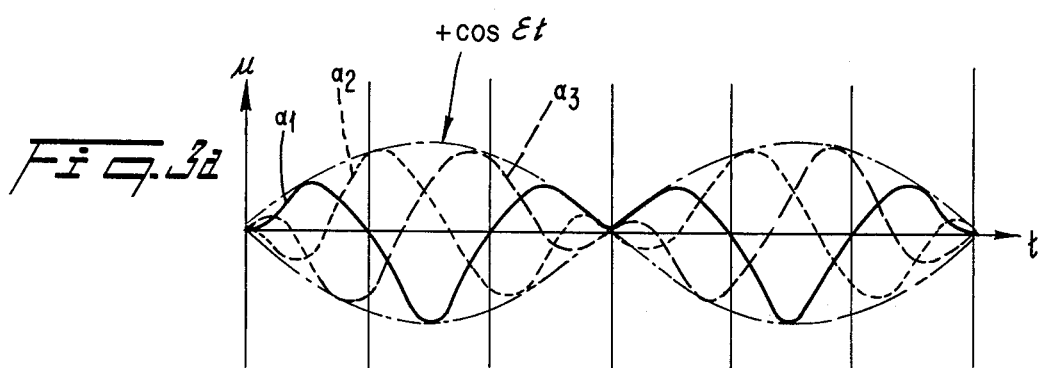
FIGS. 3a to 3c are graphs representing the voltages corresponding to the equations (3) to (5), respectively.
Figure 3B:
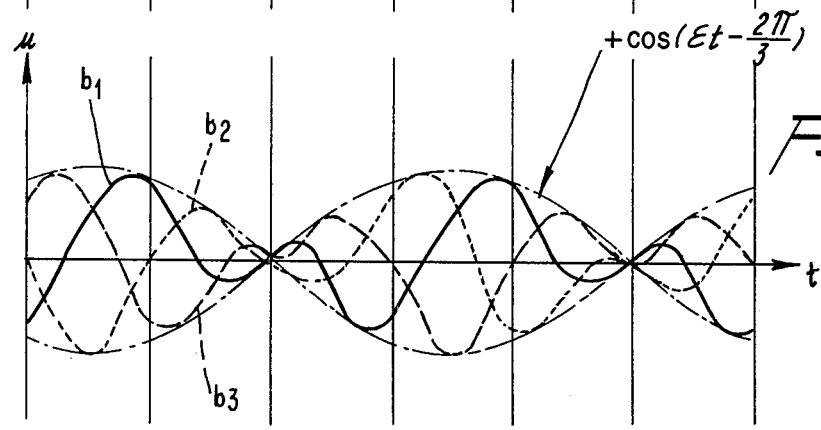
Figure 3C:
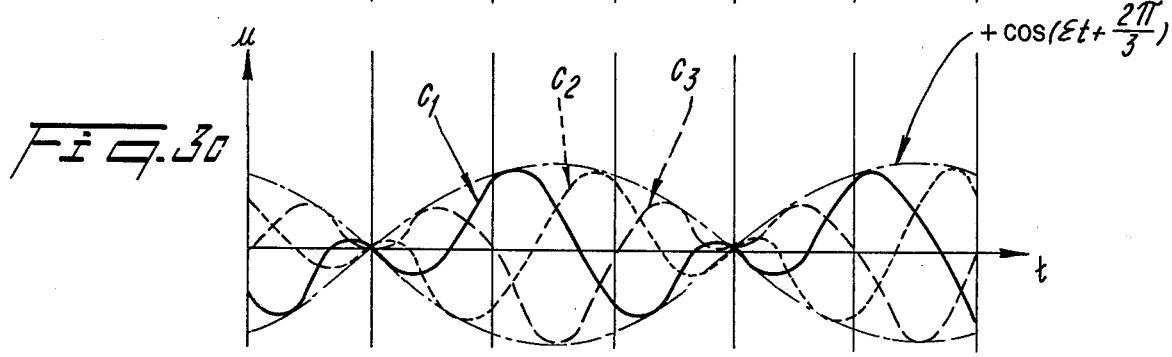
Figure 4A:
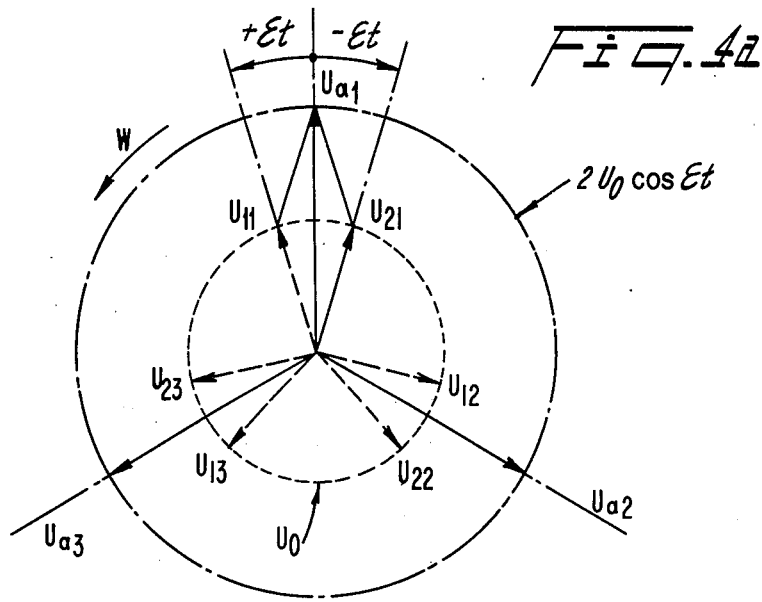
FIGS. 4a to 4c are vectorial representations of the voltages corresponding to the equations (3) to (5), respectively.
Figure 4B:
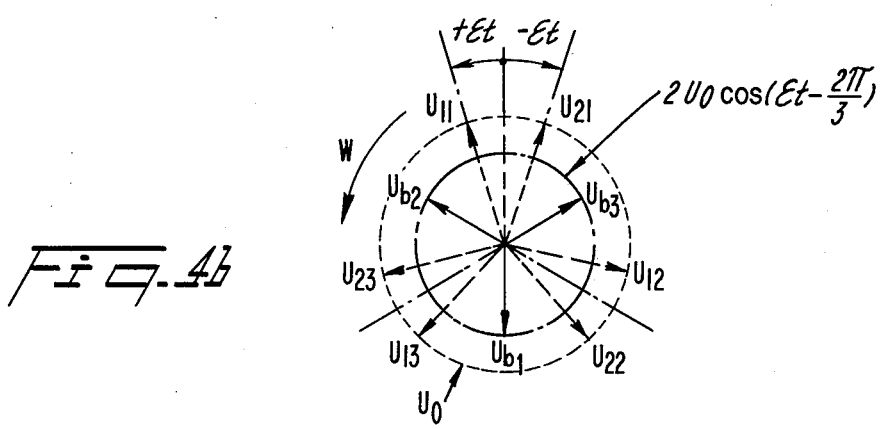
Figure 4C:
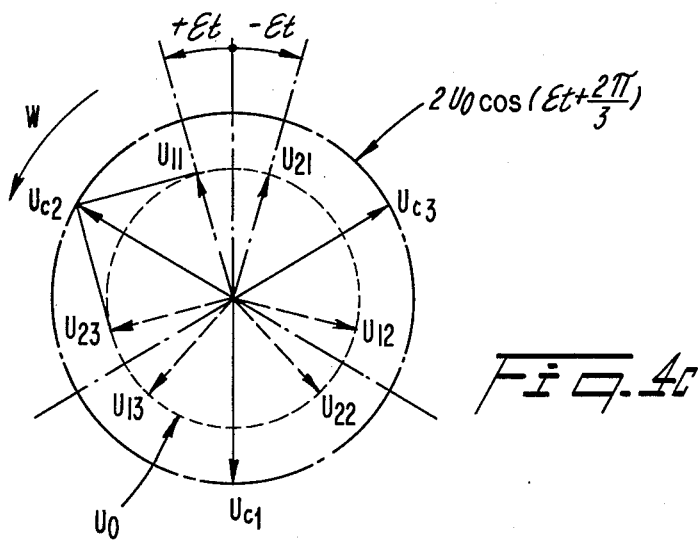
Figures 5A, 5B, 5C:
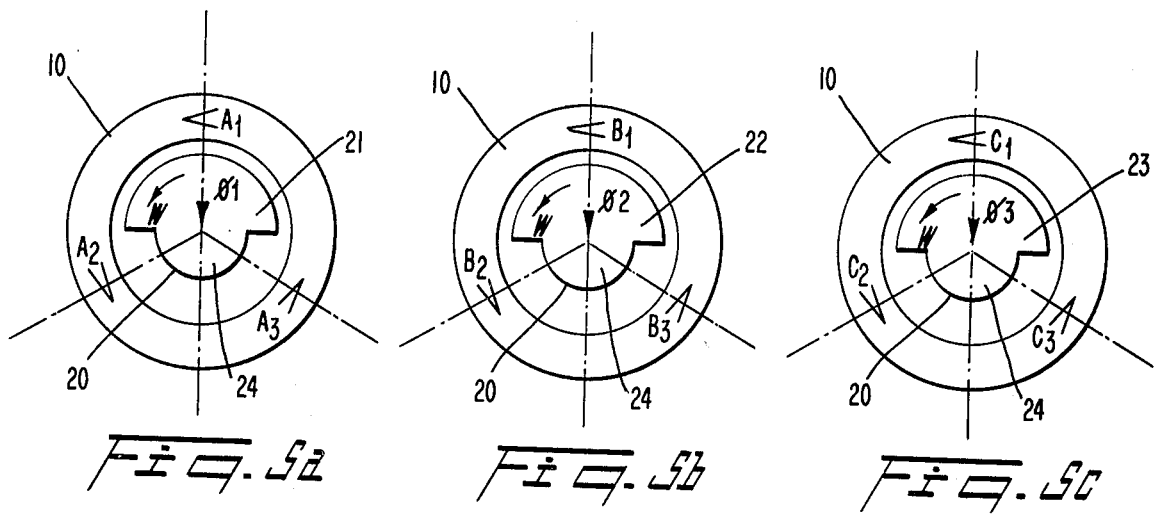
FIGS. 5a to 5c are sectional views, following the lines Va—Va, Vb—Vb, and Vc—Vc, respectively, of FIG. 6.
Figure 6:
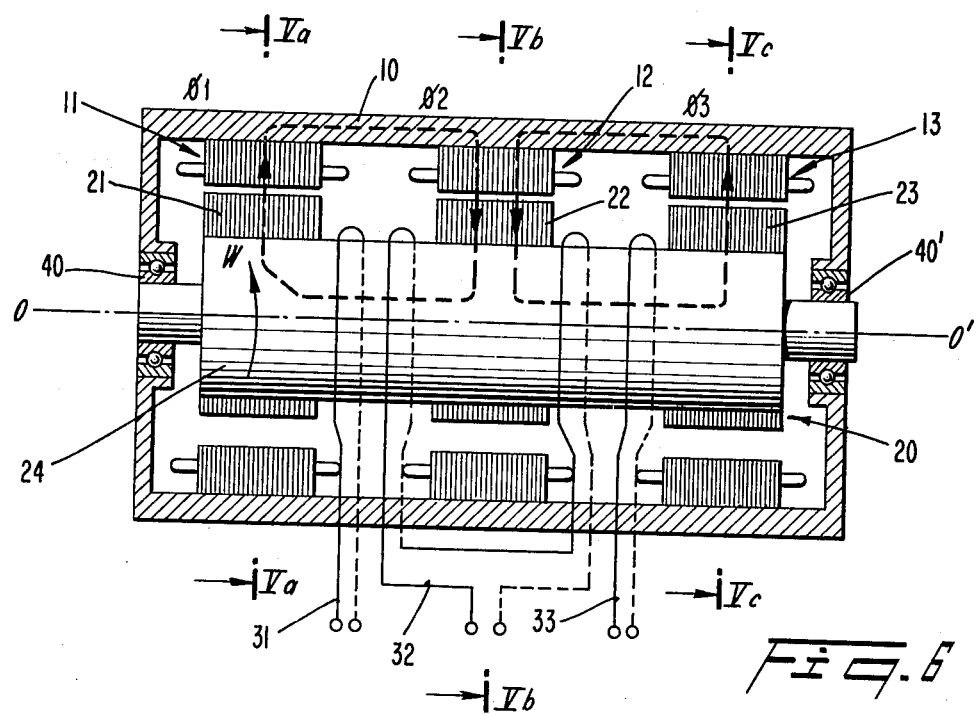
FIG. 6 is a schematic view of an axial section of a triphase demodulator according to the invention.

FIG. 6 shows the diagram of a triphase demodulator with three triphase armatures 11, 12, and 13, each including 3 phases, $A_1$, $A_2$, and $A_3$ for the armature 11 (FIG. 5a), $B_1$, $B_2$, and $B_3$ for armature 12 (FIG. 5b) and $C_1$, $C_2$, and $C_3$ for armature 13 (FIG. 5c), respectively. The armatures 11, 12, and 13 are connected by means of a common yoke 10.

The phases ($A_1$, $A_2$, $A_3$), ($B_1$, $B_2$, $B_3$), and ($C_1$, $C_2$, $C_3$) of the armatures 11, 12, and 13 are fed, respectively, by the resulting voltages ($U_{a1}$, $U_{a2}$, $U_{a3}$), ($U_{b1}$, $U_{b2}$, $U_{b3}$), and ($U_{c1}$, $U_{c2}$, $U_{c3}$) previously described and coming from a pulsating generator such as the one, for example, described in United States application Ser. No. 33,955 filed concurrently herewith (corresponding to application for a French patent Ser. No. 78.12836 filed on the 28th of April, 1978) under the name of the same Applicant and entitled "Pulsating Signal Generator For The Production of Systems of Polyphase Voltages of Interference".

In addition, the demodulator includes a rotor 20 with axis 00' which is mounted to rotate freely on bearing-blocks 40, 40' set in frame 10. The rotor includes a magnetic axle 24 bearing three magnetic circuits 21, 22, and 23, respectively. Each magnetic circuit 21, 22, and 23 includes a number of polar masses, or poles, equal to the number of pair of poles of the magnetic circuit of the corresponding armature 11, 12, and 13, respectively. In the embodiment of FIGS. 5a, 5b, 5c, and 6, for example, the machine is of the bipolar kind and each magnetic circuit 21, 22, and 23 includes a single polar mass or pole.

Further, the relative geometric keyings of the homologous phases ($A_1$, $B_1$, $C_1$), ($A_2$, $B_2$, $C_2$), and ($A_3$, $B_3$, $C_3$), respectively, of the three armatures 11, 12, and 13 of the stator are identical to the longitudinal relative keyings of the polar masses 21, 22, and 23 of the rotor 20. In the example represented in FIGS. 5a, 5b, 5c and 6, the homologous phases of the armatures 11, 12, and 13 are keyed in the same plane while the magnetic axle 24 bears three polar masses 21, 22, and 23 in line and keyed in a same plane as illustrated in FIGS. 5a-5c.

The alternating flux produced by each of the three armatures 11, 12, and 13 is respectively:

$$\phi_1 = \phi \cos \epsilon t, \; \phi_2 = \phi \cos (\epsilon t - \frac{2\pi}{3}) \text{ and} \quad (7)$$

$$\phi_3 = \phi \cos (\epsilon t + \frac{2\pi}{3})$$

The flux (magnetic fields) circulates in the longitudinal parts of the yoke 10 which are parallel to the axis 00' and forms a closed path longitudinally through the magnetic axle 24. The flux rotates about the axis 00' as described hereinafter.

Figure 7:
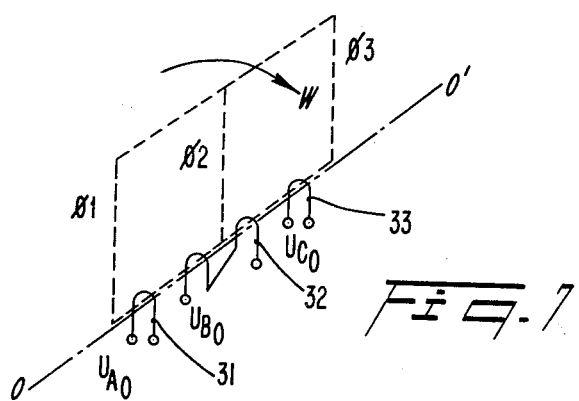
FIG. 7 is a graph representing in perspective the circulation of the flux in the demodulator of FIG. 6.

As may be seen in the schematic representation of FIG. 7, these rotating fields originated in the three armatures 11, 12, and 13 are keyed in a same radial plane rotating around the axis 00' at the speed $$\mu = \frac{\mu_1 + \mu_2}{2}$$

(see equation (1)). From the magnetic configuration of the rotor 20, it results that the rotor is driven at the speed $\omega$, in the manner of the rotor of a reluctance motor running at no-load. As it has been stated above, the value of each of these flux $\phi_1$, $\phi_2$, and $\phi_3$ is proportional to the amplitude of the three systems of triphase voltages which create them. The flux $\phi_1$, $\phi_2$, and $\phi_3$ close themselves through the axle 24 and the common yoke 10 according to the arrowed circuits on FIG. 6, thus crossing three concentirc static coils 31, 32, and 33 set around the common axle 24. The central coil 32 is, in fact, conveniently made up to two halfcoils set on one side and the other of the central armature 12. The flux $\phi_1$, $100_2$, and $\phi_3$ create at the terminals of the coils 31, 32, and 33 a system of balanced triphase voltages $U_{A_o}$, $U_{B_o}$, and $U_{C_o}$ of a frequency $$f = \frac{\epsilon}{2\pi}$$

and corresponding to equations (6).

It will be noted that the described modulator produces a change of frequency for polyphase voltages while also keeping the advantages of a transformer.

The useful parts (flux carrying parts) of the magnetic circuits should be constructed of a low loss magnetic material, taking into consideration the presence of the alternating flux passing through them. The circulation of an alternating flux of pulsation $\epsilon$ in a direction parallel to the axis of rotation of the magnetic axle 24 and the yoke 10, implies, in particular, that these parts are made up of a low loss magnetic material.

Figure 9:
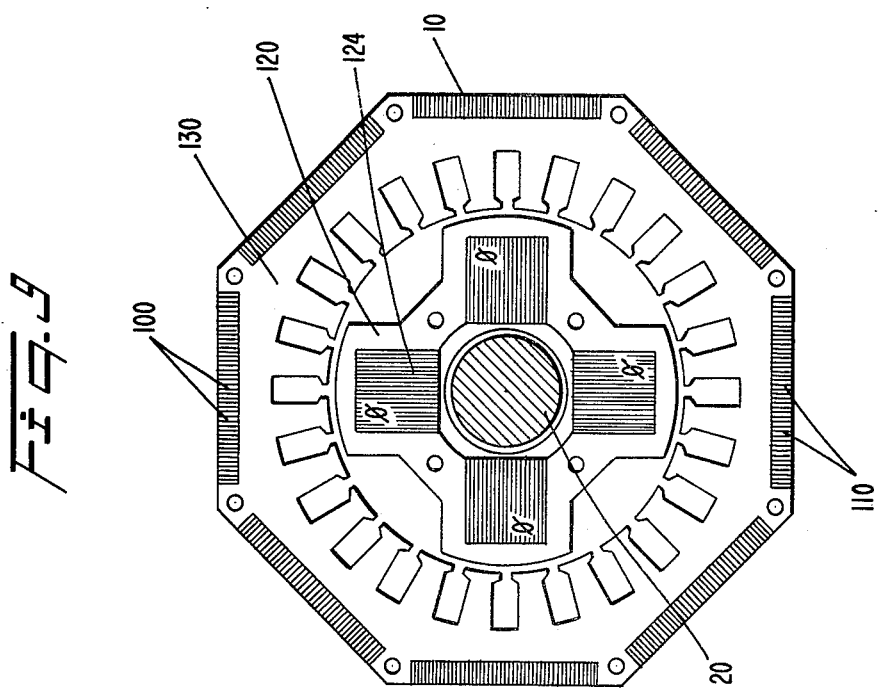
FIGS. 9, 11, and 13 are partial axial sectional views following the line IX—IX of FIG. 8, line XI—XI of FIG. 10, and line XIII—XIII of FIG. 12, respectively.
Figure 8:
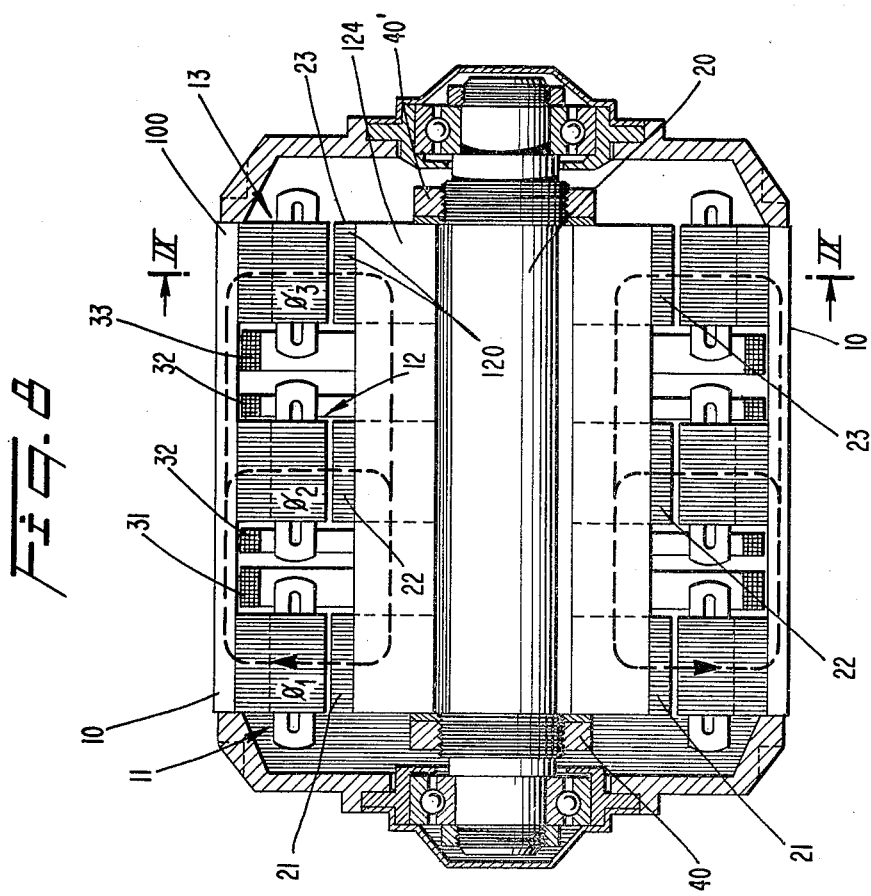

FIGS. 8 and 9 represent an example of an embodiment of the invention for a octopolar machine (seen from the stator). Referring to FIGS. 8 and 9, a rotor 20 bears magnetic circuits 21, 22, and 23 including four polar masses or poles. According to the example of FIGS. 8 and 9, the rotor 20 includes stacks of laminated flat sheet steel 124 parallel to the axis of the rotor 20, grouped in wholes incorporated within the polar masses 23 of the rotor 20. The stacks of sheet steel 124 are surrounded and bound by a stack of thin, insulated sheet steel 120 perpendicular to the axis of the rotor. The stacks of thin insulated sheet steel 120 form, in particular, the jutting out parts, or polar masses, of the magnetic circuits of the rotor and play a part both electrically in the transmission of the flux, and mechanically in the holding of laminated longitudinal sheet steel.

In the same manner the longitudinal parts of the yoke 10, may include stacks or laminations of sheet steel 100, parallel to the axis of the rotor and held, at the level of the armatures, by laminated sheet steel 130 perpendicular to the axis of the rotor.

Figure 11:
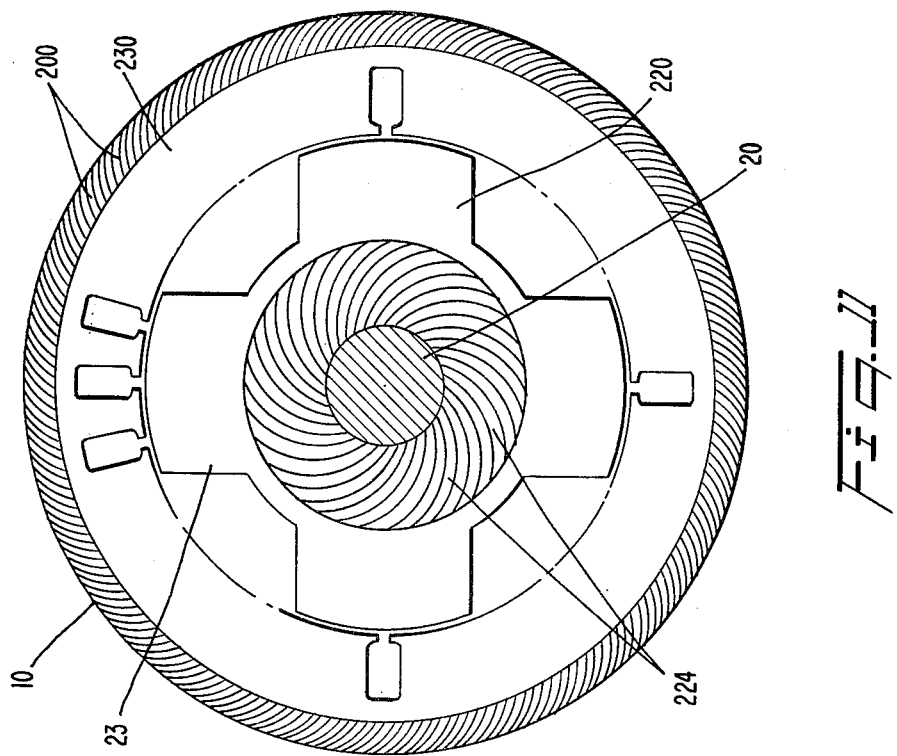
Figure 11:
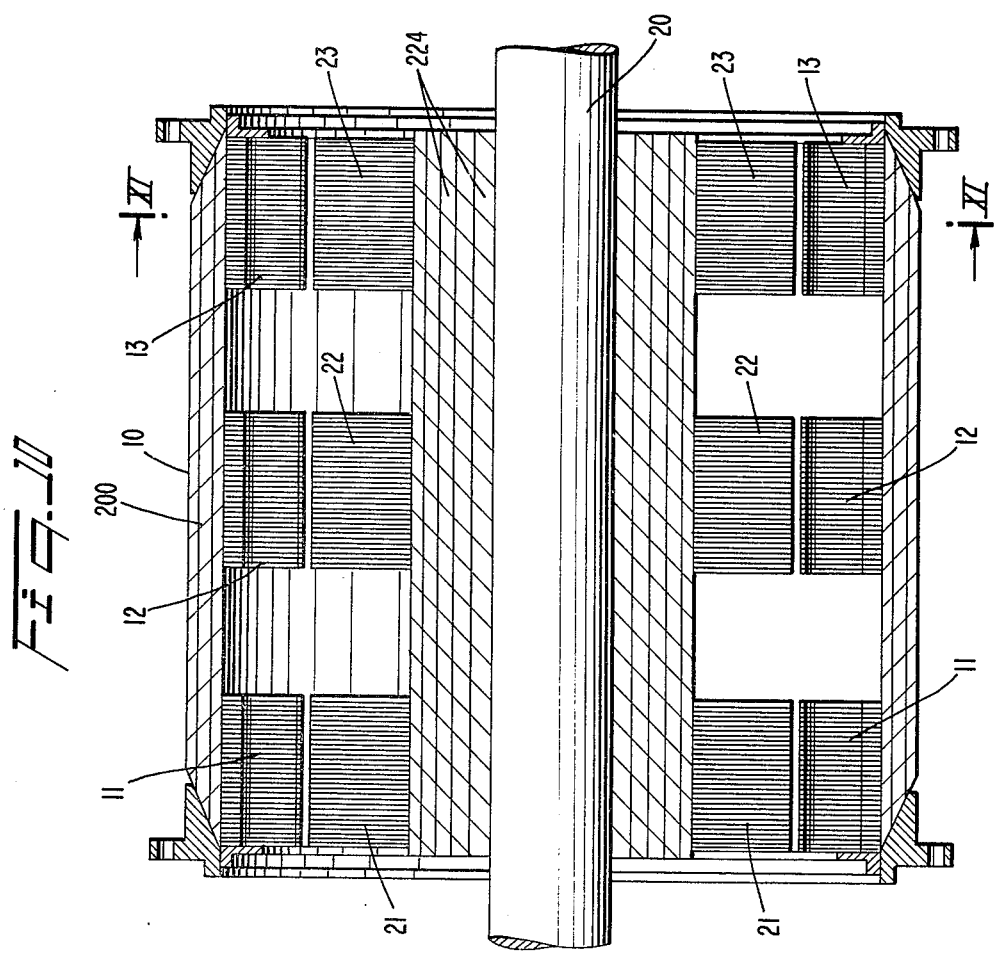

Shown schematically in FIGS. 10 and 11 is another embodiment in which stacks of laminated sheet steel 220, perpendicular to the axis of the rotor, form the magnetic circuits 21, 22, and 23 of the rotor and surrounded and bind a stack of laminations of curved sheet steel 224 forming a crown concentric with the axle of the rotor. In this embodiment, the longitudinal sheet steel 224 contained in the said crown are set in such a way that their trace on a plane perpendicular to the axis of the rotor forms a circular involute as represented in FIG. 11.

The longitudinal parts of the yoke 10 parallel to the axis of the rotor may, in the same manner, be formed starting from a stack of thin insulated curved sheet steel, parallel to the axis of the rotor, which, in a section on a plane perpendicular to the axis of the rotor, will appear as involutes of circles. The magnetic circuits of the armatures may be formed, as in the foregoing cases, of laminated sheet steel 230 stacked perpendicularly to the axis of the rotor. On FIGS. 10 and 11, for the sake of clarity, the windings of the induction and the excitating coils have not been shown.

Figure 13:
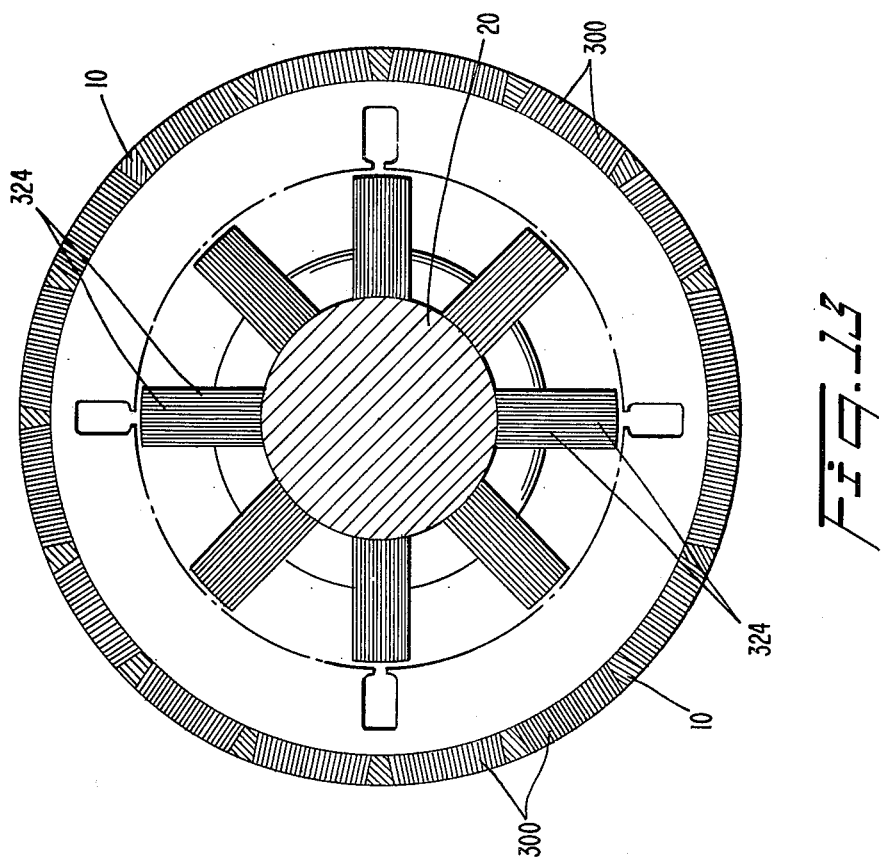
Figure 12:
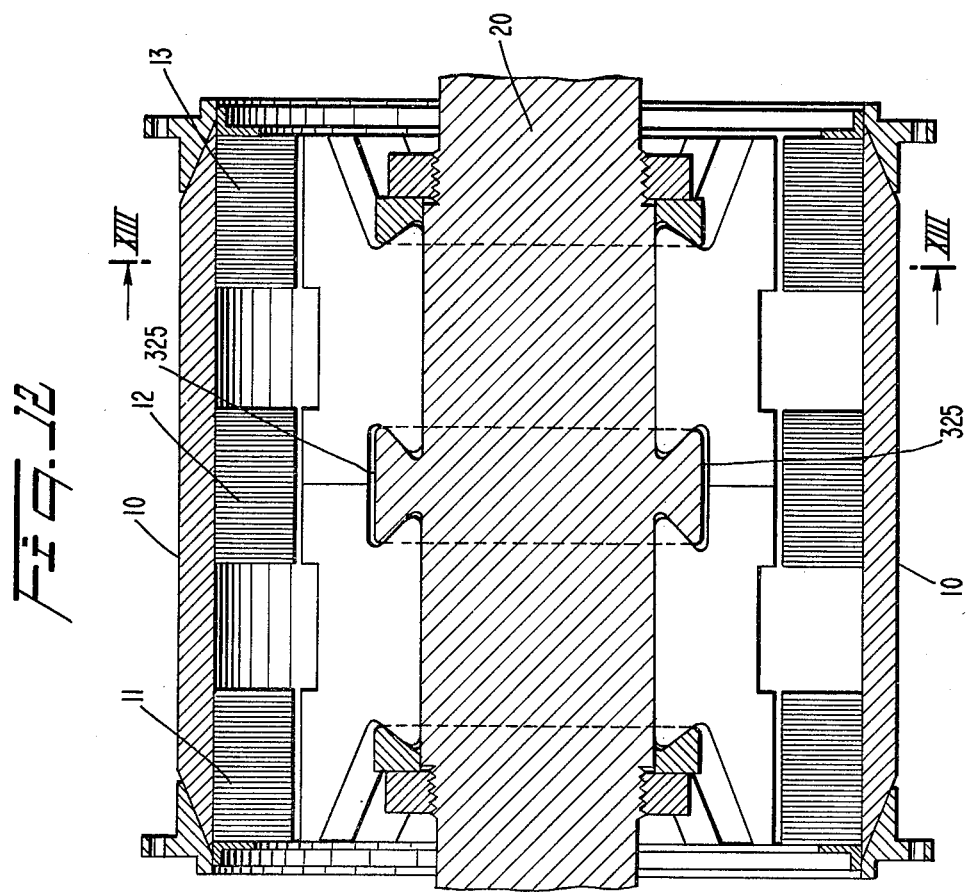

FIGS. 12 and 13 correspond to another embodiment of the invention. In this embodiment, stacks of sheet steel 324, parallel to the axis of the rotor, are mounted on the rotor in the fashion of insulating plates of collectors of direct current machines. The assemblings could thus be held in place by dovetail links such as at 325. The longitudinal parts of the yoke 10 could, in the same manner, include stacks 300 of laminated sheet steel realized according to the same technique.

It will be appreciated it is still possible to make up the useful parts of the rotor or of the yoke of a solid material, to the extent where this material presents low losses at high frequencies.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A demodulator for the demodulation of polyphase voltages to n phases interfering among themselves and constituting a system of polyphase pseudo-sinusoidal voltages modulated in amplitude at a pulsation $\epsilon$, comprising a polyphase rotating machine including:
    (a) n armatures each of n phases connected by means of a common yoke of low loss material and fed by n systems of polyphase pseudo-sinusoidal voltages modulated in amplitude to a pulsation $\epsilon$;
    (b) a rotor mounted for free rotation and including n magnetic circuits connected through a common magnetic axle, the flux carrying parts of which are of a low loss magnetic material; and
    (c) n coils concentric with the axis of the magnetic axle and at the terminals of which n systems of polyphase voltages of pulsation $\epsilon$ are collected, each one of the n magnetic circuits of the rotor bearing a number of polar masses equal to the number of pairs of poles on the corresponding armature with the relative geometric keyings of homologous phases of the n armatures of the stator being identical to the relative longitudinal keyings of the polar masses of the rotor.

2. A demodulator according to claim 1, in which the parts of the rotor and of the yoke subjected to an alternating flux comprise stacks of laminated sheet steel including first stacks of sheet steel parallel to the axis of the rotor and surrounded and bound by second stacks of sheet steel perpendicular to the axis of the rotor.

3. A demodulator according to claim 2, in which the first stacks of sheet steel, parallel to the axis of the rotor, are stacks of flat sheet steel incorporated into the polar masses of the rotor.

4. A demodulator according to claim 2, in which the first stacks of sheet steel, parallel to the axis of the rotor, form a crown concentric with the axis of the rotor, and are made up of a complex of sheet steel forming portions of a cylinder in the form of an involute of a circle.

5. A demodulator according to claim 2, in which the first stacks of sheet steel, parallel to the axis of the rotor, are mounted on the rotor in the fashion of insulating plates of collector of direct current machines.

6. A demodulator according to claim 1, in which the parts of the rotor and of the yoke subjected to an alternating flux are made up of solid circuits made of high frequency magnetic flux conductive materials.

7. A demodulator according to claim 1 in which at least one of the n coils includes two half coils set on one side and the other of one of the n armatures.

8. A demodulator according to claim 1 in which the number of phases n is equal to 3.

9. A demodulator according to claim 2 in which at least one of n coils includes two half coils set on one side and the other of one of the n armatures.

10. A demodulator according to claim 3 in which at least one of n coils includes two half coils set on one side and the other of one of the n armatures.

11. A demodulator according to claim 4 in which at least one of n coils includes two half coils set on one side and the other of one of the n armatures.

12. A demodulator according to claim 5 in which at least one of n coils includes two half coils set on one side and the other of one of the n armatures.

13. A demodulator according to claim 2 in which the number of phases n is equal to 3.

14. A demodulator according to claim 3 in which the number of phases n is equal to 3.

15. A demodulator according to claim 4 in which the number of phases n is equal to 3.

16. A demodulator according to claim 5 in which the number of phases n is equal to 3.

17. A demodulator according to claim 6 in which the number of phases n is equal to 3.

* * * * *